March 2, 1965 T. GASSINO ETAL 3,171,594
AMOUNT CHECKING DEVICE FOR ADDING, CALCULATING, ACCOUNTING AND SIMILAR MACHINES
Filed Aug. 3, 1962 2 Sheets-Sheet 1

INVENTOR.
TERESIO GASSINO
BY NICOLO GIOLITTI
Kenyon & Kenyon

March 2, 1965 T. GASSINO ETAL 3,171,594
AMOUNT CHECKING DEVICE FOR ADDING, CALCULATING, ACCOUNTING
AND SIMILAR MACHINES
Filed Aug. 3, 1962 2 Sheets-Sheet 2

INVENTOR.
TERESIO GASSINO
BY NICOLO GIOLITTI
Kenyon & Kenyon

United States Patent Office 3,171,594
Patented Mar. 2, 1965

3,171,594
AMOUNT CHECKING DEVICE FOR ADDING, CALCULATING, ACCOUNTING AND SIMILAR MACHINES
Teresio Gassino and Nicolo Giolitti, Ivrea, Italy, assignors to Ing. C. Olivetti & C. S.p.A., Via Jerris, Ivrea, Italy, a corporation of Italy
Filed Aug. 3, 1962, Ser. No. 214,615
Claims priority, application Italy, Aug. 31, 1961, 15,911/61
10 Claims. (Cl. 235—60.47)

This invention relates to adding, calculating, accounting and similar machines having a multiorder register conditionable for accumulating amounts, a normally effective transfer device for said register, and a cyclically operating mechanism for conditioning said register during an accumulating machine cycle. More particularly, this invention relates to a device for checking an amount accumulated in said register, for example the account number of an accounting ledger.

Normally the account number is recorded in a corner of the ledger, whereas recorded in another part thereof is a checking amount of key-number, which will be used for checking the account number. Upon having introduced the ledger in the machine the account number is first set-up and accumulated in a register. Then the key-number is set-up and accumulated in the register to obtain a predetermined total.

In the known amount checking devices said key-number is the complement of the account number with respect to the register capacity, whereby by adding the account number and the key-number the register should be cleared. The conventional registers having a tens-transfer device and a fugitive one device and having a number of denominational orders, i.e. a capacity, greater than the amount set-up mechanism of the machine are unadapted for checking an account number accumulated therein, because they require a key-number having as many "nine" digits as there are non significant digits of the number to be checked, whereby the setting-up of the key-number will be more intricate and more easily subject to mistake than the number to be checked.

To obviate these disadvantages it has been proposed to provide the machine with a special register having no tens-transfer device, in order to use a key-number having each significant or non-zero digit equal to the ten complement of the corresponding significant digit of the number to be checked. However such a special register cannot be used for other purposes, whereas it must be located in a valuable location in the machine, i.e. in correspondence of the differential actuators thereof, whereby the machine capability will be reduced with respect to the cost of manufacture.

It is the primary object of the invention to provide an amount checking device obviating the above disadvantages.

Another object is to provide a checking device inexpensive to manufacture and reliable to operate.

A further object is to provide a checking device wherein a convnetional register having a tens-transfer device and a fugitive one device may be used for accumulating the amount to be checked.

According to the invention, we now provide a device for checking a total accumulated in said register, said checking device comprising in combination means presettable for rendering said transfer device ineffective during a selected accumulating machine cycle, whereby a checking amount accumulated in said register during said selected cycle and having each significant digit equal to the ten complement of the corresponding significant digit of said total will clear said register, and means controlled by said operating mechanism in a cycle following said selected cycle for checking the clear or non-clear condition of said register.

Other objects, features and advantages of the invention will become apparent from the following description of a preferred embodiment thereof and from the annexed drawings, wherein.

Figures 1, 3:
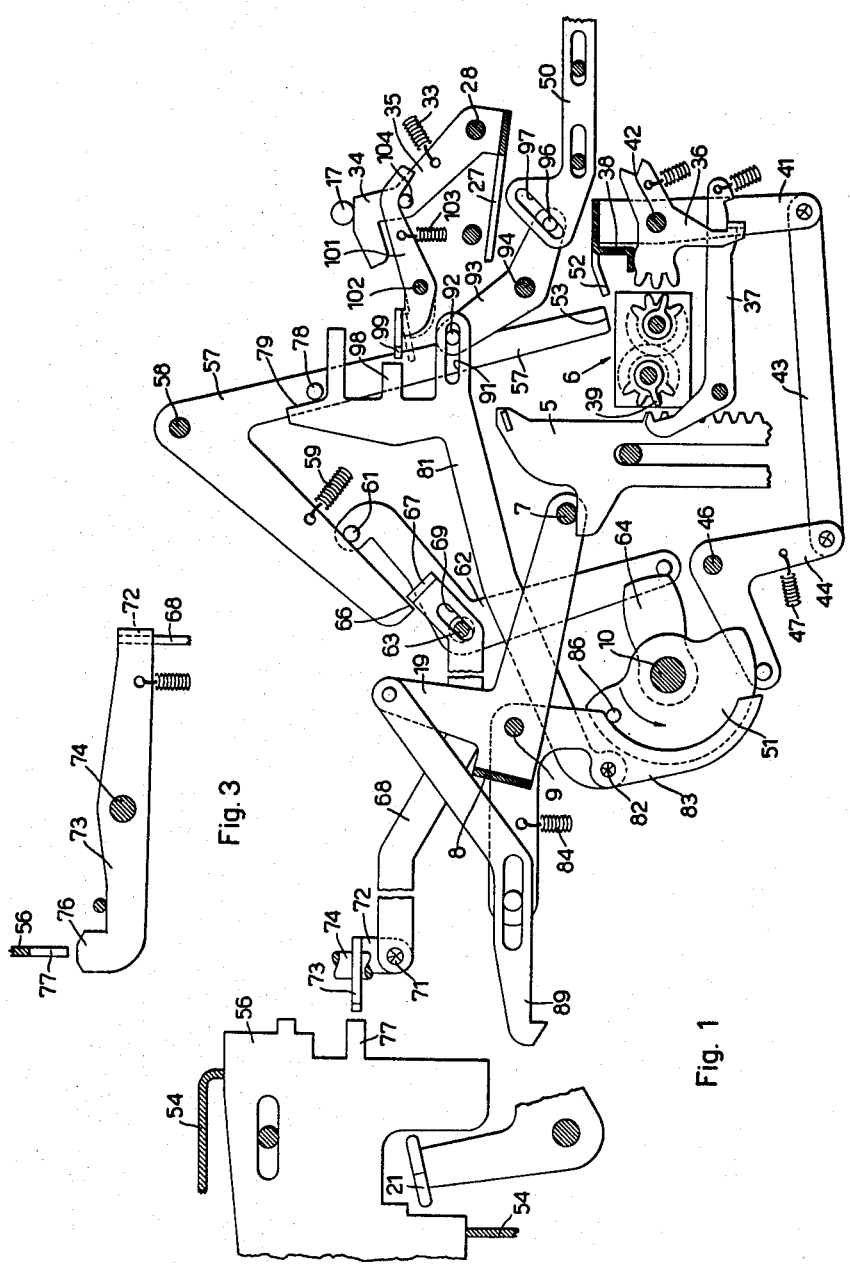
FIG. 1 is a left-hand longitudinal partial sectional view of an accounting machine embodying a checking device according to the invention.
FIG. 3 is a plane view of a detail of FIG. 1.

The accounting machine embodying the checking device according to the invention comprises a set of actuators 5 (FIG. 1) conditionable to be differentially moved from a zero position shown in the drawings to represent an amount. The movement of the actuator 5 may be controlled by either an amount set-up mechanism not shown or a conventional multiorder register, generically indicated by the numeral 6. Furthermore, the machine comprises a cyclically operating mechanism for conditioning the actuators 5, said mechanism comprising a main shaft 10 adapted to be cyclically rotated in a manner known per se.

More particularly the shaft 10 is provided with a pair of complementary cams 11 (FIG. 2) adapted to rock at each cycle a bail 8 about a stationary shaft 9 first counterclockwise and then clockwise. The bail 8 is provided with a universal bar 7 adapted to cause the actuators 5 to be first differentially moved upwards by the urge of individual springs not shown and then downwards by the action of the same bar 7. Moreover the shaft 10 is adapted to engage and disengage the register 6 with the actuators 5 in the due time in accumulating machine cycles and in total taking cycles in a known manner not requiring to be described.

A set of sensing elements 22 (FIG. 2) associated with the set of actuators 5 are adapted to individually sense whether the associated actuator is in the zero position or not. More particularly, each element 22 is formed of a conventional zero printing control latch normally urged by a spring 23 to contact a projection 24 of a corresponding actuator 5, and normally latching a corresponding typecarrier not shown for preventing same from effecting an impression. Each latch 22 is provided with a notch 25 adapted to engage a universal member or transverse bar 26 adapted to be engaged by the notch 25 when the corresponding latch 22 is rocked clockwise in response to an upward movement of the associated actuator 5 from its zero position.

The bar 26 is a portion of a plate 27 which is provided with a lug 29 adapted to be engaged by a projection 30 of a lever 31 which may be rocked clockwise by a cam 32 of the main shaft 10. The plate 27 is provided with an arm 35 urged by a spring 33 to normally contact through its shoulder 34 a pin 17 of a slide 18 linked to an arm 19 of the bail 8. Due to the rocking movement of the bail 8, the slide 18 will be horizontally reciprocated at any machine cycle, whereby the pin 17 will release the plate 27 before being engaged by the projection 30 of the lever 31. The plate 27 is thus slightly rocked clockwise by the urge of the spring 33 to cause the transverse bar 26 to simultaneously sense a portion or shoulder 20 of the latches 22 to check whether all the actuators 5 are in their zero position or not. It will be thus clear that in a total taking cycle the transverse bar 26 through the latches 22 and the actuators 5 is adapted to check the clear or non clear condition of the register.

The register 5 (FIG. 1) is provided with a normally effective tens-transfer device substantially of the type described in the United States Letters Patent No. 2,826,366. More particularly, said transfer device comprises a set of transfer trip members or levers 37 each one associated with a corresponding register order and operable by a transfer tooth 39 thereof when moved through a zero position, and a set of transfer actuators or sectors 36 fulcrumed on a stationary shaft 42. Each sector 36 is normally locked by a corresponding trip lever 37 and is releasable thereby when operated for transferring a unit to the next higher order of the register. Furthermore the transfer device comprises a universal bar 38 pivoted on the shaft 42 and provided with an arm 41 connected by a link 43 to a lever 44 pivoted at 46 and urged by a spring 47 to contact a cam 51 of the main shaft 10.

At each machine cycle, at the end of the counterclockwise rotation of the bail 8, while the cam 32 (FIG. 2) through the lever 31 rocks the plate 27 counterclockwise, the cam 51 (FIG. 1) causes the lever 44 to be rocked clockwise. The link 43 thus will rock clockwise the arm 41 together with the universal bar 38. In the accumulating machine cycles the register 6 is now engaged with the actuators 5, which during their return movement will accumulate into the register the amount represented thereby. During this return movement, the transfer tooth 39 if moved through its zero position operates the lever 37 thus releasing the sector 36 which is now rocked clockwise.

After the actuators 5 have been restored, the register 6 is disengaged therefrom and is engaged with the sectors 36. The cam 51, through the lever 44 and the link 43, rocks now the bail 38 counterclockwise, thus relocking each released sector 36 to the corresponding lever 37 and causing same to transfer a unit to the next higher order of the register. It will be thus clear that the universal bar 38 is reciprocable first to enable the transfer actuators 36 to be released by the trip members 37 and then to cause the released actuators to be relocked thereby.

The accounting machine is provided with a function conditioning member or slide 50 adapted to be located in a first position, as shown in FIG. 1, during an accumulating machine cycle and to be shifted rearwards (leftwards in FIG. 1) during a total taking cycle, manually or automatically in a known manner.

The accounting machine also comprises a transversely movable paper carriage 54 and a program control device for controlling the machine functions in any columnar position of the carriage. The program control device comprises a set of columnar stops 56 mounted on the carriage substantially in the manner described in the United States Letters Patent No. 2,849,179 issued to Capellaro. More particularly when a stop 56 is located in position of FIG. 1 the carriage 54 is locked in the corresponding columnar position. When a machine cycle is started the stop 56 is moved forwards by an actuating member 21 in the manner described in the cited Patent No. 2,849,179, in order to control the various machine functions on said columnar position. At the end of the machine cycle the stop 56 is moved rearwards beyond the position of FIG. 1, in order to release the carriage for a tabulating stroke. The carriage stroke will be stopped by the next following stop 56, which is brought in the position of FIG. 1 when the carriage reaches the corresponding columnar position.

The amount checking device according to the invention comprises means presettable for rendering the transfer device ineffective during a selected accumulating cycle. More particularly said presettable means are formed of a lever 57 pivoted at 58 and having one end 53 adapted to cooperate with a lug 52 provided on the universal bar 38. The lever 57 is normally urged by a spring 59 to contact a pin 61 of a lever 62 pivoted on a stationary shaft 63. The lever 62 in turn normally contacts a cam 64 of the main shaft 10, whereby the end 53 of the lever 57 is normally held out of the path of the lug 52.

The lever 57 is provided with another end 66 adapted to cooperate with a bent lug 67 of a link 68 slidably mounted by means of an inclined slot 69 on the shaft 63 and pivoted at 71 on a bent lug 72 of a lever 73. This lever is fulcrumed on a vertical shaft 74 (FIG. 3) and is provided with a projection 76 adapted to be engaged by an element or projection 77 (FIG. 1) which may be selectively provided on the columnar stops 56.

The lever 57 is further provided with a pin 78 adapted to cooperate with a projection 79 of a slide 81. One end of the slide 81 is linked at 82 on a lever 83 pivoted on the shaft 9 and normally urged by a spring 84 to contact a pin 86 of the cam 51. The lever 83 is pin-and-slot connected with an error signaling means formed of a pawl 89 pivoted on the arm 19 of the bail 8.

The other end of the slide 81 is slidably mounted by means of a slot 91 on a pin 92 of a lever 93 pivoted at 94 and having a pin 96 engaging a slot 97 of the slide 50. The slide 81 is provided with a projection 98 adapted to cooperate with a bent lug 99 of a lever 101 pivoted at 102 and normally urged by a spring 103 to contact a pin 104 of the arm 35 of the plate 27, the action of the spring 33 being stronger than the action of the spring 103.

The checking device operates as follows.

To check an amount, particularly to check the account number of an accounting ledger, first the number is set-up in the machine and by means of the actuators 5 is accumulated into the register 6 in a first accumulating machine cycle. Subsequently a checking amount or key-number having each significant digit equal to the ten complement of the corresponding significant digit of the total accumulated in the register is set-up in the machine. The checking amount is now accumulated in the register 6 in a second selected accumulating machine cycle during which the tens-transfer device is rendered ineffective. At last in a total taking cycle following said selected accumulating cycle the clear or non-clear condition of the register will be checked. If the register is in the clear condition the checked amount is right, if the register is in a non-clear condition the error signaling means will be operated.

The clear condition of the register could be also obtained when the first and second accumulating machine cycle are started without having set-up any amount. To detect such erroneous operation the clear or non-clear condition of the register must be also checked in said first and second accumulating machine cycle, during which the error signaling means should be operated when the clear condition of the register is checked.

At the beginning of each machine cycle the cam 64 of the main shaft 10 releases the lever 62, whereas the bail 8 is rocked counterclockwise and shifts the pawl 89 rearwards. Furthermore the pin 86 of the cam 51 releases the lever 83. If the machine cycle is effected in correspondence with a columnar position of the carriage defined by a stop 56 having no projection 77, the lever 57 is arrested by the lug 67 of the link 68. The pin 78 of the lever 57 in turn will arrest the slide 81, whereas the end 53 remains out of the path of the lug 52, whereby the tens-transfer device is not affected thereby.

In order to automatically control the first and the second accumulating cycle and the subsequent total taking cycle, the program control device of the machine must be provided with three corresponding columnar stops 56 each one having the projection 77, the first stop 56 must be located in the columnar position wherein the account number will be accumulated, the second stop 56 in the columnar position wherein the key-number will be accumulated and the third stop 56 in the columnar position wherein the total thereof will be taken from the register.

When an account number of an account ledger is to be checked, first the ledger is inserted into the paper carriage in a known manner, and the carriage is moved to locate the columnar position wherein the first account number will be accumulated in correspondence with the printing point. Then the operator reads the account number, which is printed on the ledger, and, by means of the conventional keyboard, sets-up said number in the amount set-up mechanism of the machine. The motor bar of the machine is now depressed and causes the stop 56 of said first columnar position to be moved forward (rightwards in FIG. 1) in the manner described in the cited Patent No. 2,849,179. Consequently, the projection 77 rocks the lever 73 counterclockwise (FIG. 3) and moves the link 68 rearward (FIG. 1) whereby its lug 67 is brought out of the path of the end 66. At the beginning of the machine cycle, which is started in a known manner in response of the forward movement of the stop 56, the cam 64 of the main shaft 10 releases the lever 62 thus enabling the lever 57 to be rocked counterclockwise by the spring 59. The lever 57 on one hand removes the pin 78 away from the projection 79 of the slide 81 and on the other hand places its end 53 above the lug 52 of the bar 38.

The end 53 prevents now the universal bar 38 from being rocked clockwise at the end of the counterclockwise rotation of the bail 8, whereby the sectors 36 are prevented from being released by the levers 37 and from transferring the unit to the next higher order of the register. The tens-transfer device is thus rendered ineffective. Since before the account number being set-up the register 6 should be clear, in this first accumulating cycle no tens will be transferred. The tens-transfer device will not operate, and the cycle will not be affected by the lever 57.

Figure 2:
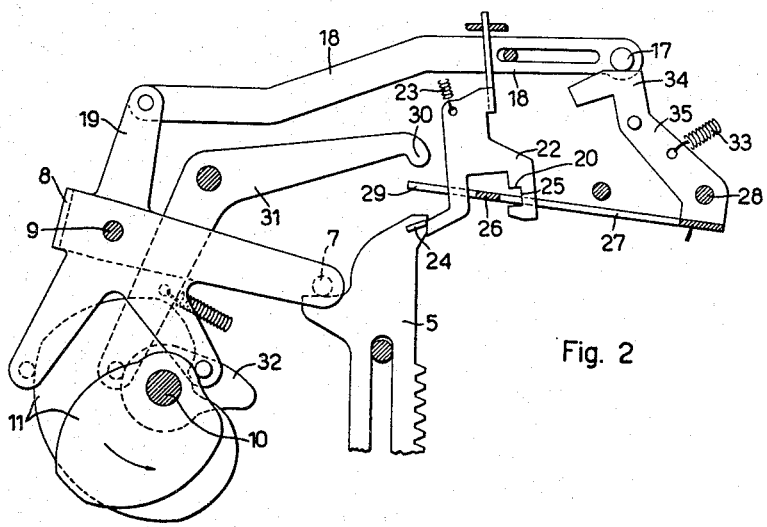
FIG. 2 is another left hand longitudinal partial sectional view of the machine of FIG. 1.

Now the bail 8 through the universal bar 7 conditions the actuators 5 to be differentially moved out of zero position, while through the slide 18 shifts the pin 17 rearwards (FIG. 2). The pin 17 releases thus the shoulder 34 of the arm 35, whereby the plate 27 is urged to be rocked clockwise by the spring 33. If at least one of the actuators 5 has been moved out of the zero position, the projection 24 causes the latch 22 to engage the notch 25 with the transverse bar 26. The shoulder 20 of the engaged latch 22 prevents now the plate 27 to be rocked clockwise, whereby the lever 101 (FIG. 1) remains in the position shown in the drawings.

On the contrary, if no actuator 5 has been moved from the zero position, no latch 22 (FIG. 2) engages the transverse bar 26, whereby the plate 27 may be rocked clockwise. The pin 104 (FIG. 1) of the arm 35 rocks now the lever 101 counterclockwise and places the lug 99 in the dotted position of FIG. 1. Furthermore during the counterclockwise rotation of the bail 8, the pin 86 of the cam 51 releases the lever 83 which is now urged by the spring 84 to rock counterclockwise and to shift the slide 81 forwards.

Since this first cycle is an accumulating cycle, the slide 50 remains in the position of FIG. 1 together with the lever 93, and the pin 92 does not move the slide 81 vertically. If the amount accumulated during the actual cycle is different than zero, the projection 98 of the slide 81 is arrested by the lug 99 of the lever 101, which is in the position of FIG. 1. The lever 83 remains thus substantially in the position of FIG. 1 and does not lower the pawl 89. On the contrary, if the amount accumulated is zero, that is if no amount has been set-up before starting the machine cycle, the lug 99 is rocked in the dotted position and does not arrest the projection 98 of the slide 81. This slide is thus moved forwards enabling the lever 83 to be rocked counterclockwise and to lower the pawl 89, which remains in the lower position for signaling an error.

The lever 31 (FIG. 2) rocks then the plate 27 counterclockwise to move downwards the engaged latches 22. If no error has been signaled in this first cycle, at the end of the cycle the carriage is automatically moved in a known manner to locate the second columnar position wherein the key-number will be accumulated in correspondence with the printing point. The operator now reads the key-number, which is also printed on the ledger, and sets-up said key number in the set-up mechanism. The motor bar is then depressed causing the stop 56 of said second columnar position to be moved forwards.

This second accumulating cycle is now effected in a manner similar to the above described first cycle. Since each significant digit of the key-number now accumulated is equal to the ten complement of the corresponding significant digit of the number accumulated in the register 6 during the above first cycle, and since the tens-transfer device is again disabled, if the account number and the key-number have been correctly set-up, at the end of the second cycle the register will be clear. On the contrary, if any digit of the above two numbers has been incorrectly set-up, at the end of the second cycle the corresponding register order will not be clear.

At the end of the second cycle the carriage is automatically moved to locate the third columnar position, wherein the total will be taken from the register. The stop 56 of the said third column is now automatically moved forward, in the manner described in the cited Patent No. 2,849,179, thus starting a total taking machine cycle. The tens-transfer device is now disabled by the lever 57 in a manner similar to that described for the first and second cycle. Since in the total taking cycle the tens-transfer device is never operated, this cycle will not be affected by the lever 57.

Furthermore, in response to the forward movement of the stop 56 the slide 50 is now moved rearward in a known manner. The slot 97 of the slide 50 causes now the lever 93 to be rocked counterclockwise, whereby the pin 92 will lower the slide 81 with the projection 98. The third machine cycle is now effected in a manner similar to the above described first and second cycle, the only difference being that a total taking cycle is effected instead of an accumulating cycle. During this third cycle the clear or non-clear condition of the register is checked by sensing the latches 22 (FIG. 2) in a manner similar to that described above for the first cycle. In this third cycle, if the total taken is zero, that is if the register 6 has been cleared by the key-number, since the plate 27 rocks clockwise, the lug 99 is located in the dotted position, which is now on the path of the projection 98, whereby the slide 81 cannot be moved forwards. On the contrary, if the total is not zero, that is if the register is in non-clear condition, the plate 27 encounters some shoulders 20 and cannot be rocked clockwise, whereby the lug 99 remains above the path of the projection 98. The slide 81 is now moved forwards and, by means of the lever 83, lowers the pawl 89 for signaling an error.

In any cycle the error is signaled during the clockwise rotation of the bail 8 when the pawl 89, upon having been lowered, is returned forwards. The pawl 89 then may operate a known member, for example a keyboard locking member, a front-feed controlling member, or a program altering member.

It is intended that modifications, improvements and additions of parts may be made to the described checking device without departing from the scope of the invention. For example the clear or non-clear condition of the register may be checked by directly sensing the register instead of the actuators. Furthermore the lever 57 may be hand controlled instead of being controlled by columnar stops. Finally the checking device should be embodied in non listing adding or calculating machine.

What we claim is:

1. In an adding machine having a multiorder register conditionable for accumulating amounts, a normally effective transfer device for said register, and a cyclically operating mechanism for conditioning said register during an accumulating machine cycle, a device for checking a total accumulated in said register, said checking device comprising in combination:

(a) means operable by said operating mechanism for rendering said transfer device ineffective simultaneously in each order of said register during a selected accumulating machine cycle, whereby a checking amount accumulated in said register during said selected cycle and having each significant digit equal to the ten complement of the corresponding significant digit of said total will clear said register, (b) means presettable for conditioning said operable means for operation, (c) and means controlled by said operating mechanism in a cycle following said selected cycle for checking the clear or non-clear condition of said register.

2. In an adding machine having a multiorder register conditionable for accumulating amounts, a set of transfer trip members each one associated with a corresponding register order and operable thereby when moved through a zero position, a set of transfer actuators associated with said set of trip members, each actuator being normally locked by the corresponding trip member and being releasable thereby when operated for transferring a unit to the next higher order of said register, and a cyclically operating mechanism for conditioning said register during an accumulating machine cycle, a device for checking a total accumulated in said register, said checking device comprising in combination:

(a) a member operable by said operating mechanism for simultaneously locking said actuators irrrespective of said trip members during a selected accumulating machine cycle thus preventing said unit from being transferred, whereby a checking amount accumulated in said register during said selected cycle and having each significant digit equal to the ten complement of the corresponding significant digit of said total will clear said register, (b) means presettable for conditioning said operable member for operation, (c) and means operable by said operating mechanism in a cycle following said selected cycle for checking the clear or non-clear condition of said register.

3. In an adding machine having a multiorder register conditionable for accumulating amounts, a set of transfer trip members each one associated with a corresponding register order and operable thereby when moved through a zero position, a set of transfer acuators associated with said set of trip members, each actuator being normally locked by the corresponding trip member and being releasable thereby when operated for transferring a unit to the next higher order of said register, a universal bar reciprocable first to enable said actuators to be released by said trip members and then to cause the released actuators to be relocked thereby, and a cyclically operating mechanism for conditioning said register during an accumulating machine cycle and for reciprocating said universal bar, a device for checking a total accumulated in said register, said checking device comprising in combination:

(a) a member operable by said operating mechanism for preventing said bar from being reciprocated during a selected accumulating machine cycle thus preventing said unit from being transferred, whereby a checking amount accumulated in said register during said selected cycle and having each significant digit equal to the ten complement of the corresponding digit of said total will clear said register, (b) means presettable for conditioning said operable member for operation, (c) and means operable by said mechanism in a cycle following said selected cycle for checking the clear or non-clear condition of said register.

4. In an adding machine having a multiorder amount entering mechanism, a multiorder register, a set of actuators for accumulating in said register an amount entered into said mechanism, a tens-transfer device for said register, a cyclically operating mechanism for operating said actuators during an accumulating machine cycle or a total taking cycle, said tens-transfer device being normally effective during said accumulating machine cycle, a device for checking a total accumulated in said register, said device comprising in combination:

(a) means operable by said operating mechanism for rendering said transfer device ineffective simultaneously in each order of said register during a selected accumulating machine cycle, whereby a checking amount accumulated in said register during said selected cycle and having each significant digit equal to the ten complement of the corresponding significant digit of said total will clear said register, (b) means presettable for conditioning said operable means for operation, (c) and means controlled by said operating mechanism in a total taking cycle for checking the clear or non-clear condition of said register.

5. In an adding listing machine having a set of actuators conditionable to be differentially moved from a zero position to represent an amount, a multiorder register for either accumulating said represented amount or for controlling the movement of said actuators, a normally effective transfer device for said register, a set of sensing elements associated with said actuators and adapted to individually sense whether the associated actuator is in the zero position or not, and a cyclically operating mechanism for conditioning said actuators during an accumulating machine cycle or a total taking cycle, a device for checking a total accumulated in said register, said checking device comprising in combination:

(a) a member operable by said operating mechanism for rendering said transfer device ineffective simultaneously in each order of said register during a selected accumulating machine cycle, whereby a checking amount accumulated in said register during said selected cycle and having each significant digit equal to the ten complement of the corresponding significant digit of said total will clear said register, (b) means presettable for conditioning said operable member for operation, (c) and a universal member controlled by all said sensing elements in a total taking cycle subsequent to said selected cycle for checking the clear or non-clear condition of said register.

6. In an adding listing machine having a set of actuators conditionable to be differentially moved from a zero position to represent an amount, a multiorder register for either accumulating said represented amount or for controlling the movement of said actuators, a normally effective transfer device for said register, a set of zero printing control latches associated with said actuators and adapted to individually sense whether the associated actuator is in the zero position or not and operable when sensing a non-zero position of the corresponding actuator, a universal member reciprocable for operating said latches, and a cyclically operating mechanism for conditioning said actuators during an accumulating machine cycle or a total taking cycle and for reciprocating said universal member, a device for checking a total accumulated in said register, said checking device comprising in combination:

(a) a member operable by said operating mechanism for rendering said transfer device ineffective simultaneously in each order of said register during a selected accumulating machine cycle, whereby a checking amount accumulated in said register during said selected cycle and having each significant digit equal to the ten complement of the corresponding significant digit of said total will clear said register, (b) means presettable for conditioning said operable member for operation, (c) a portion on each one of said latches, (d) and means for causing said universal member to simultaneously sense said portion of said latches before being so reciprocated in a total taking cycle following said selected cycle in order to check the clear or non-clear condition of said register.

7. In an adding listing machine having a set of actuators conditionable to be differentially moved from a zero position to represent an amount, a multiorder register for either accumulating said represented amount or for controlling the movement of said actuators, a normally effective transfer device for said register, and a cyclically operating mechanism for conditioning said actuators during an accumulating machine cycle or a total taking cycle, a device for checking a total accumulated in said register, said checking device comprising in combination:
   (a) a member operable by said operating mechanism for rendering said transfer device ineffective simultaneously in each order of said register during a selected accumulating machine cycle, whereby a checking amount accumulated in said register during said selected cycle and having each significant digit equal to the ten complement of the corresponding non zero digit of said total will clear said register,
   (b) means presettable for conditioning said operable member for operation,
   (c) means operated by said operating mechanism for simultaneously sensing said actuators,
   (d) and error signaling means controlled by said sensing means to be operated by said operating mechanism either when all said actuators are in their zero positions or not.

8. In an adding listing machine having a set of actuators conditionable to be differentially moved from a zero position to represent an amount, a multiorder register for either accumulating said represented amount or for controlling the movement of said actuators, a normally effective transfer device for said register, a cyclically operating mechanism for conditioning said actuators during an accumulating machine cycle or a total taking cycle, and a function conditioning member adapted to be located in a first position during said accumulating machine cycle and in a second position during said total taking cycle, a device for checking a total accumulated in said register, said checking device comprising in combination:
   (a) a member operable by said operating mechanism for rendering said transfer device ineffective simultaneously in each order of said register during a selected accumulating machine cycle, whereby a checking amount accumulated in said register during said selected cycle and having each significant digit equal to the ten complement of the corresponding significant digit of said total will clear said register,
   (b) means presettable for conditioning said operable member for operation,
   (c) a universal member operated by said operating mechanism for simultaneously sensing said actuators,
   (d) and error signaling means jointly controlled by said function conditioning member and said universal member to be operated by said operating mechanism during an accumulating machine cycle when all said actuators are in their zero position and during a total taking cycle when said actuators are not all in their zero position.

9. In an accounting machine having a set of actuators conditionable to be differentially moved from a zero position to represent an amount, a multiorder register for either accumulating said represented amount or for controlling the movement of said actuators, a normally effective transfer device for said register, a cyclically operating mechanism for conditioning said actuators during an accumulating machine cycle or a total taking cycle, a transversely movable paper carriage, and a program control device for controlling the machine functions in any columnar position of said carriage, a device for checking a total accumulated in said register, said checking device comprising in combination:
   (a) a member operable by said operating mechanism for rendering said transfer device ineffective simultaneously in each order of said register during a selected accumulating machine cycle, whereby a checking amount accumulated in said register during said selected cycle and having each significant digit equal to the ten complement of the corresponding significant digit of said total will clear said register,
   (b) means presettable for conditioning said operable member for operation,
   (c) means operated by said operating mechanism for simultaneously sensing said actuators,
   (d) normally ineffective error signaling means adapted to be controlled by said sensing means to be operated by said operating mechanism either when all said actuators are in their zero positions or not,
   (e) and an element on said program control device for presetting said member and for rendering said signaling means effective.

10. In an accounting machine having a set of actuators conditionable to be differentially moved from a zero position to represent an amount, a multiorder register for either accumulating said represented amount or for controlling the movement of said actuators, a normally effective transfer device for said register, a cyclically operating mechanism for conditioning said actuators during an accumulating machine cycle or during a total taking cycle, a function conditioning member adapted to be located in a first position during an accumulating machine cycle and in a second position during a total taking cycle, a transversely movable paper carriage, and a program control device for controlling the machine functions in any columnar position of said carriage, a device for checking a total accumulated in said register, said checking device comprising in combination:
   (a) a member operable by said operating mechanism for rendering said transfer device ineffective simultaneously in each order of said register during a selected accumulating machine cycle, whereby a checking amount accumulated in said register during said selected cycle and having each significant digit equal to the ten complement of the corresponding significant digit of said total will clear said register,
   (b) means presettable for conditioning said operable member for operation,
   (c) a universal member operated by said operating mechanism for simultaneously sensing said actuators,
   (d) normally ineffective error signaling means adapted to be jointly controlled by said function conditioning member and said universal member to be operated by said operating mechanism during an accumulating machine cycle when all said actuators are in their zero position and during a total taking cycle when said actuators are not all in their zero position,
   (e) and an element on said program control device for presetting said transfer disabling member and for rendering said signaling means effective in a series of three subsequent columnar positions of said carriage, the total to be checked being accumulated in said register in the first columnar position of said series, said checking amount being accumulated in said register in the second columnar position of said series, whereas said register is cleared in a total taking cycle in the third columnar position of said series.

References Cited by the Examiner
UNITED STATES PATENTS

| | | | |
|---|---|---|---|
| 1,118,103 | 11/14 | Carroll | 235—60.25 |
| 1,624,105 | 4/27 | Landsiedel | 235—60 |
| 2,849,179 | 8/58 | Capellaro | 235—60.47 |

LEO SMILOW, *Primary Examiner.*